US012581273B2

(12) United States Patent
Chen et al.

(10) Patent No.: US 12,581,273 B2
(45) Date of Patent: Mar. 17, 2026

(54) METHOD, DEVICE AND COMPUTER STORAGE MEDIUM OF COMMUNICATION

(71) Applicant: NEC CORPORATION, Tokyo (JP)

(72) Inventors: Zhe Chen, Beijing (CN); Gang Wang, Beijing (CN)

(73) Assignee: NEC CORPORATION, Tokyo (JP)

( * ) Notice: Subject to any disclaimer, the term of this patent is extended or adjusted under 35 U.S.C. 154(b) by 354 days.

(21) Appl. No.: 18/015,615

(22) PCT Filed: Jul. 13, 2020

(86) PCT No.: PCT/CN2020/101720
§ 371 (c)(1),
(2) Date: Jan. 11, 2023

(87) PCT Pub. No.: WO2022/011515
PCT Pub. Date: Jan. 20, 2022

(65) Prior Publication Data
US 2023/0247389 A1      Aug. 3, 2023

(51) Int. Cl.
*H04W 4/06* (2009.01)
*H04L 1/08* (2006.01)
*H04L 1/1812* (2023.01)

(52) U.S. Cl.
CPC .................. *H04W 4/06* (2013.01); *H04L 1/08* (2013.01); *H04L 1/1812* (2013.01)

(58) Field of Classification Search
CPC ....... H04W 4/06; H04W 76/11; H04W 76/40; H04L 1/08; H04L 1/1812
See application file for complete search history.

(56) References Cited

U.S. PATENT DOCUMENTS

2013/0315124 A1    11/2013  Rapaport et al.
2014/0080484 A1     3/2014  Centonza et al.
2014/0355493 A1    12/2014  Niu et al.
(Continued)

FOREIGN PATENT DOCUMENTS

CN        102547592 A      7/2012
CN        103988559 A      8/2014
(Continued)

OTHER PUBLICATIONS

Extended European Search Report dated Jul. 7, 2023 in Application No. 20945661.5.

(Continued)

*Primary Examiner* — Abdullahi Ahmed
(74) *Attorney, Agent, or Firm* — Sughrue Mion, PLLC

(57) ABSTRACT

Embodiments of the present disclosure relate to method, device and computer readable medium of communication. The method comprises determining, at a network device, a data radio bearer associated with a multicast service; and transmitting, to a terminal device, first information comprising an identity of the multicast service and an identity of the data radio bearer. The method further comprises receiving, at the terminal device, the first information from the network device; and performing a communication between the terminal device and the network device based on the first information. In this way, simultaneous transmission of multicast and unicast for a MBMS can be achieved and reliability of the MBMS can be enhanced.

16 Claims, 6 Drawing Sheets

(56) References Cited

U.S. PATENT DOCUMENTS

| | | | |
|---|---|---|---|
| 2016/0157065 A1 | 6/2016 | Lee et al. | |
| 2020/0323024 A1 | 10/2020 | Huang et al. | |
| 2022/0338291 A1* | 10/2022 | Hong | H04W 72/30 |
| 2023/0087614 A1* | 3/2023 | Wang | H04L 12/1868 |
| | | | 370/312 |
| 2023/0091236 A1 | 3/2023 | Fujishiro | |
| 2023/0099695 A1* | 3/2023 | Kang | H04W 4/06 |
| | | | 370/312 |
| 2023/0110505 A1* | 4/2023 | Wang | H04L 1/08 |
| | | | 370/331 |
| 2023/0140463 A1* | 5/2023 | Liu | H04W 4/06 |
| | | | 370/229 |
| 2023/0141637 A1* | 5/2023 | Wang | H04W 4/08 |
| | | | 370/329 |

FOREIGN PATENT DOCUMENTS

| | | |
|---|---|---|
| CN | 105493531 A | 4/2016 |
| CN | 108476142 A | 8/2018 |
| CN | 109983789 A | 7/2019 |
| CN | 110062430 A | 7/2019 |
| CN | 110611889 A | 12/2019 |
| CN | 112312575 A | 2/2021 |
| CN | 115379395 A | 11/2022 |
| EP | 4 084 559 A1 | 11/2022 |
| EP | 4 145 869 A1 | 3/2023 |
| JP | 2020-123941 A | 8/2020 |
| WO | 2018/030305 A1 | 2/2018 |
| WO | 2019/129212 A1 | 7/2019 |
| WO | 2019/161927 A1 | 8/2019 |
| WO | 2019/223780 A1 | 11/2019 |
| WO | 2020/020209 A1 | 1/2020 |
| WO | 2021/241663 A1 | 12/2021 |

OTHER PUBLICATIONS

Qualcomm Incorporated, "Solution 3 editor's notes removals", SA WG2 Meeting #139E S2-2004219, May 22, 2020, 8 pages.
International Search Report for PCT/CN2020/101720, dated Apr. 9, 2021.
Written Opinion for PCT/CN2020/101720, dated Apr. 9, 2021.
JP Office Action for JP Application No. 2023-501581, mailed on Jan. 9, 2024 with English Translation.
LG Electronics Inc., "Active Recovery of MBMS Data", 3GPP TSG-RAN WG2#60bis R2-080385, Jan. 14-18, 2008, p. 1-p. 4.
IN Office Action for Indian Patent Application No. 202317002023, mailed on Jun. 7, 2024.
CN Office Action for CN Application No. 202080104867.5, mailed on Mar. 30, 2024 with English Translation.
"Agenda-services-210420-1800", 3GPP TSG CT WG1 Meeting#123-e C1-202003, Apr. 22, 2020, pp. 1-162.
LG Electronics Inc., "Use of eMBMS for Group Communication", 3GPP Tsg-Ran WG2 #83bis R2-133358, Sep. 27, 2013, pp. 1-6.
CN Office Communication for CN Application No. 202080104867. 5, mailed on Apr. 29, 2025 with English Translation.
EP Office Action for EP Application No. 20945661.5, mailed on Oct. 17, 2025.

* cited by examiner

300

310

RECEIVE, AT A TERMINAL DEVICE AND FROM A NETWORK DEVICE, FIRST INFORMATION COMPRISING AN IDENTITY OF A MULTICAST SERVICE AND AN IDENTITY OF A DATA RADIO BEARER

320

PERFORM A COMMUNICATION BETWEEN THE TERMINAL DEVICE AND THE NETWORK DEVICE BASED ON THE FIRST INFORMATION

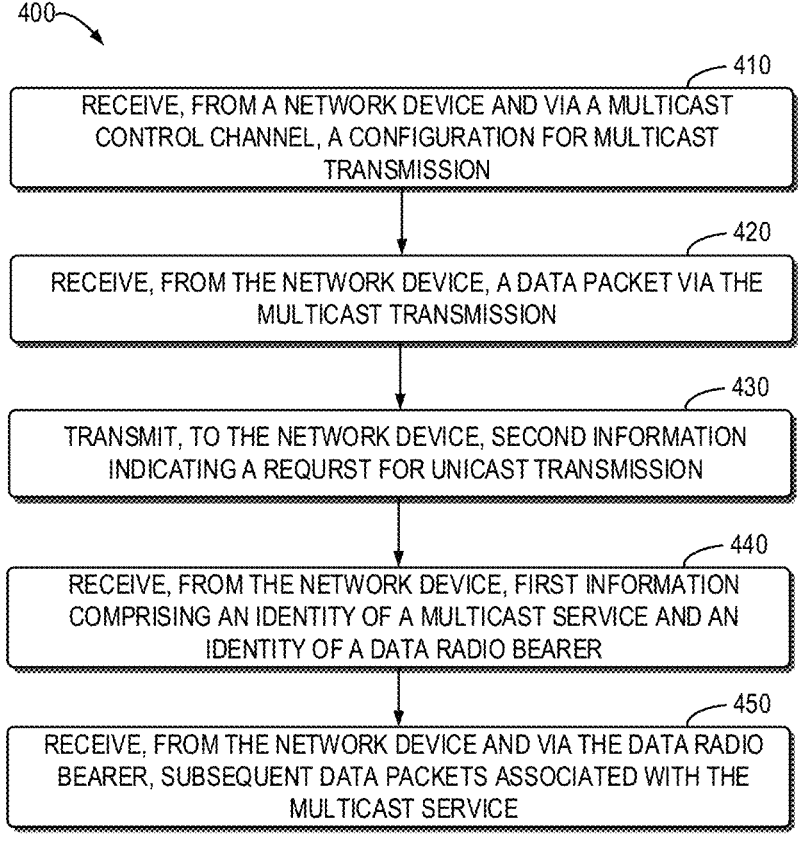

400

RECEIVE, FROM A NETWORK DEVICE AND VIA A MULTICAST CONTROL CHANNEL, A CONFIGURATION FOR MULTICAST TRANSMISSION — 410

RECEIVE, FROM THE NETWORK DEVICE, A DATA PACKET VIA THE MULTICAST TRANSMISSION — 420

TRANSMIT, TO THE NETWORK DEVICE, SECOND INFORMATION INDICATING A REQURST FOR UNICAST TRANSMISSION — 430

RECEIVE, FROM THE NETWORK DEVICE, FIRST INFORMATION COMPRISING AN IDENTITY OF A MULTICAST SERVICE AND AN IDENTITY OF A DATA RADIO BEARER — 440

RECEIVE, FROM THE NETWORK DEVICE AND VIA THE DATA RADIO BEARER, SUBSEQUENT DATA PACKETS ASSOCIATED WITH THE MULTICAST SERVICE — 450

DETERMINE, AT A NETWORK DEVICE, A DATA RADIO BEARER ASSOCIATED WITH A MULTICAST SERVICE

720

TRANSMIT, TO A TERMINAL DEVICE, A FIRST MESSAGE COMPRISING AN IDENTITY OF THE MULTICAST SERVICE AND AN IDENTITY OF THE DATA RADIO BEARER

METHOD, DEVICE AND COMPUTER STORAGE MEDIUM OF COMMUNICATION

CROSS REFERENCE TO RELATED APPLICATIONS

This application is a National Stage of International Application No. PCT/CN2020/101720 filed Jul. 13, 2020.

TECHNICAL FIELD

Embodiments of the present disclosure generally relate to the field of telecommunication, and in particular, to methods, devices and computer storage media of communication for multimedia broadcast multicast service (MBMS) transmission.

BACKGROUND

In current MBMS transmission, a terminal device firstly monitors a system information block 2 (SIB2). If the SIB2 schedules a SIB13 for MBMS, the terminal device will monitor the SIB13. In the SIB13, the terminal device obtains scheduling information of a MBMS control channel (MCCH), which schedules a MBMS traffic channel (MTCH). Thus, in the current MBMS transmission, there is no packet data convergence protocol (PDCP) layer. Further, the terminal device cannot feedback whether a data packet is received correctly, and thus there is no retransmission mechanism in the current MBMS transmission.

To enhance the MBMS, it has been agreed that a simultaneous transmission of multicast and unicast is required to be enabled for the MBMS. Accordingly, how to achieve the simultaneous transmission has become a hot issue.

SUMMARY

In general, embodiments of the present disclosure provide methods, devices and computer storage media of communication for MBMS transmission.

In a first aspect, there is provided a method of communication. The method comprises: receiving, at a terminal device and from a network device, first information comprising an identity of a multicast service and an identity of a data radio bearer; and performing a communication between the terminal device and the network device based on the first information.

In a second aspect, there is provided a method of communication. The method comprises: determining, at a network device, a data radio bearer associated with a multicast service; and transmitting, to a terminal device, first information comprising an identity of the multicast service and an identity of the data radio bearer.

In a third aspect, there is provided a terminal device. The terminal device comprises a processor and a memory coupled to the processor. The memory stores instructions that when executed by the processor, cause the terminal device to perform the method according to the first aspect of the present disclosure.

In a fourth aspect, there is provided a network device. The network device comprises a processor and a memory coupled to the processor. The memory stores instructions that when executed by the processor, cause the network device to perform the method according to the second aspect of the present disclosure.

In a fifth aspect, there is provided a computer readable medium having instructions stored thereon. The instructions, when executed on at least one processor, cause the at least one processor to perform the method according to the first aspect of the present disclosure.

In a sixth aspect, there is provided a computer readable medium having instructions stored thereon. The instructions, when executed on at least one processor, cause the at least one processor to perform the method according to the second aspect of the present disclosure.

Other features of the present disclosure will become easily comprehensible through the following description.

BRIEF DESCRIPTION OF THE DRAWINGS

Through the more detailed description of some embodiments of the present disclosure in the accompanying drawings, the above and other objects, features and advantages of the present disclosure will become more apparent, wherein:

FIG. 4 illustrates another example method of communication implemented at a terminal device in accordance with some embodiments of the present disclosure;

Throughout the drawings, the same or similar reference numerals represent the same or similar element.

DETAILED DESCRIPTION

Figure 1:
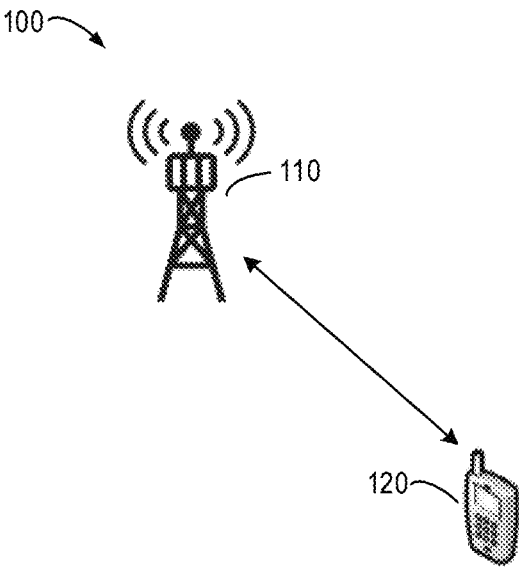
FIG. 1 illustrates an example communication network in which some embodiments of the present disclosure can be implemented.

Principle of the present disclosure will now be described with reference to some embodiments. It is to be understood that these embodiments are described only for the purpose of illustration and help those skilled in the art to understand and implement the present disclosure, without suggesting any limitations as to the scope of the disclosure. The disclosure described herein can be implemented in various manners other than the ones described below.

In the following description and claims, unless defined otherwise, all technical and scientific terms used herein have the same meaning as commonly understood by one of ordinary skills in the art to which this disclosure belongs.

As used herein, the term "terminal device" refers to any device having wireless or wired communication capabilities. Examples of the terminal device include, but not limited to, user equipment (UE), personal computers, desktops, mobile phones, cellular phones, smart phones, personal digital assistants (PDAs), portable computers, tablets, wearable devices, internet of things (IoT) devices, Internet of Everything (IoE) devices, machine type communication (MTC) devices, device on vehicle for V2X communication where X means pedestrian, vehicle, or infrastructure/network, or image capture devices such as digital cameras, gaming devices, music storage and playback appliances, or Internet appliances enabling wireless or wired Internet access and browsing and the like. The term "terminal device" can be used interchangeably with a UE, a mobile station, a subscriber station, a mobile terminal, a user terminal or a wireless device. In addition, the term "network device" refers to a device which is capable of providing or hosting a cell or coverage where terminal devices can communicate. Examples of a network device include, but not limited to, a Node B (NodeB or NB), an evolved NodeB (eNodeB or eNB), a next generation NodeB (gNB), a transmission reception point (TRP), a remote radio unit (RRU), a radio head (RH), a remote radio head (RRH), a low power node such as a femto node, a pico node, and the like.

In one embodiment, the terminal device may be connected with a first network device and a second network device. One of the first network device and the second network device may be a master node and the other one may be a secondary node. The first network device and the second network device may use different RATs. In one embodiment, the first network device may be a first RAT device and the second network device may be a second RAT device. In one embodiment, the first RAT device is eNB and the second RAT device is gNB. Information related with different RATs may be transmitted to the terminal device from at least one of the first network device and the second network device. In one embodiment, first information may be transmitted to the terminal device from the first network device and second information may be transmitted to the terminal device from the second network device directly or via the first network device. In one embodiment, information related with configuration for the terminal device configured by the second network device may be transmitted from the second network device via the first network device. Information related with reconfiguration for the terminal device configured by the second network device may be transmitted to the terminal device from the second network device directly or via the first network device.

As used herein, the singular forms 'a', 'an' and 'the' are intended to include the plural forms as well, unless the context clearly indicates otherwise. The term 'includes' and its variants are to be read as open terms that mean 'includes, but is not limited to.' The term 'based on' is to be read as 'at least in part based on.' The term 'one embodiment' and 'an embodiment' are to be read as 'at least one embodiment.' The term 'another embodiment' is to be read as 'at least one other embodiment.' The terms 'first,' and the like may refer to different or same objects. Other definitions, explicit and implicit, may be included below.

In some examples, values, procedures, or apparatus are referred to as 'best,' 'lowest,' 'highest,' 'minimum,' 'maximum,' or the like. It will be appreciated that such descriptions are intended to indicate that a selection among many used functional alternatives can be made, and such selections need not be better, smaller, higher, or otherwise preferable to other selections.

As mentioned above, in the current MBMS transmission, there is no PDCP layer, and the terminal device cannot feedback whether a data packet is received correctly. Thus, there is no retransmission mechanism in the current MBMS transmission. To enhance the MBMS, it has been agreed that a simultaneous transmission of multicast and unicast is required to be enabled for the MBMS. In this case, cooperation between the unicast and multicast transmission should be defined.

In view of this, embodiments of the present disclosure provide an improved solution of communication for MBMS transmission. The solution can associate a data radio bearer (DRB) with a MBMS (for convenience, also referred to as a multicast service herein). The DRB is configured for a unicast transmission associated with the multicast service. In this way, simultaneous transmission of unicast and multicast for the multicast service can be allowed, and quality and user experience of the multicast service can be enhanced accordingly. Principles and implementations of the present disclosure will be described in detail below with reference to the figures.

FIG. 1 illustrates a schematic diagram of an example communication network 100 in which embodiments of the present disclosure can be implemented. As shown in FIG. 1, the communication network 100 may include a network device 110 and a terminal device 120 served by the network device 110. The network device 110 may communicate with the terminal device 120 via a channel such as a wireless communication channel.

It is to be understood that the number of devices in FIG. 1 is given for the purpose of illustration without suggesting any limitations to the present disclosure. The communication network 100 may include any suitable number of network devices and/or terminal devices adapted for implementing implementations of the present disclosure.

The communications in the communication network 100 may conform to any suitable standards including, but not limited to, Global System for Mobile Communications (GSM), Long Term Evolution (LTE), LTE-Evolution, LTE-Advanced (LTE-A), Wideband Code Division Multiple Access (WCDMA), Code Division Multiple Access (CDMA), GSM EDGE Radio Access Network (GERAN), Machine Type Communication (MTC) and the like. Furthermore, the communications may be performed according to any generation communication protocols either currently known or to be developed in the future. Examples of the communication protocols include, but not limited to, the first generation (1G), the second generation (2G), 2.5G, 2.75G, the third generation (3G), the fourth generation (4G), 4.5G, the fifth generation (5G) communication protocols.

For example, the network device 110 may broadcast a multicast service such as a MBMS via a multicast channel such as MTCH associated with the multicast service. The terminal device 120 may receive the multicast service via the multicast channel accordingly.

According to embodiments of the present disclosure, a PDCP layer is introduced in the MBMS transmission. The network device 110 may configure a DRB for a unicast transmission associated with the multicast service and transmit an association between the DRB and the multicast service to the terminal device 120. The terminal device 120 may receive a data packet associated with the multicast service via both the DRB and the multicast channel. With the DRB, the terminal device 120 may feedback whether the data packet is received successfully. If the data packet is not received successfully, the network device 110 may retransmit the data packet to the terminal device 120 via the DRB. More details are described below with reference to FIG. 2.

Figure 2:
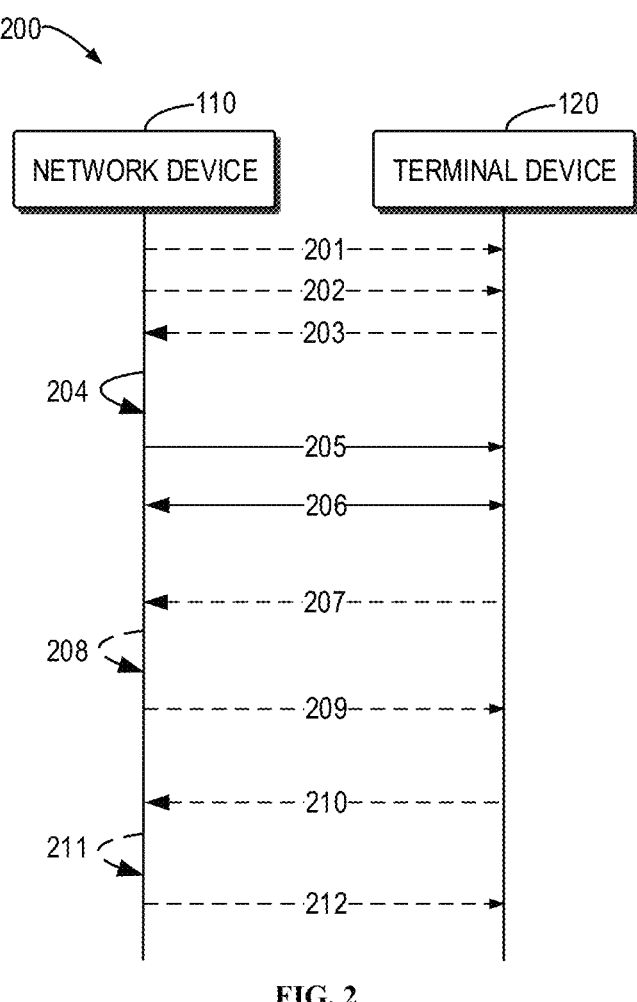
FIG. 2 illustrates a schematic diagram illustrating a process of communication for MBMS transmission according to some embodiments of the present disclosure.

FIG. 2 illustrates a schematic diagram illustrating a process 200 of communication for MBMS transmission according to some embodiments of the present disclosure. For the purpose of discussion, the process 200 will be described with reference to FIG. 1. The process 200 may involve the network device 110 and the terminal device 120 as illustrated in FIG. 1.

As shown in FIG. 2, the network device 110 may transmit 201 a configuration for multicast transmission of a MBMS via a multicast control channel such as a MCCH. In some embodiments, the network device 110 may periodically transmit the configuration. It should be noted that it is merely an example, any other suitable ways for transmission of the configuration are also feasible.

According to embodiments of the present disclosure, the configuration is for establishment of a PDCP entity of the multicast transmission. In some embodiments, the configuration may comprise at least one of the following: an identity of the multicast service, a length of an identity of a data packet associated with the multicast service; and an indication (also referred to as a fourth indication herein) about whether the multicast service supports both the multicast transmission and a unicast transmission associated with the multicast service. In some embodiments, the identity of the data packet may be a serial number (SN) of the data packet, for example, a PDCP SN. Of course, any other suitable ways are also feasible, and the present application does not make limitation for this.

In some embodiments, the network device 110 may transmit the configuration via a RRC message. For example, the RRC message may be a MBMSAreaConfiguration message as listed below.

```
MBMSAreaConfiguration
MBMS-SessionInfo
MBMS-pdcp-Config ::=              SEQUENCE {
    drb                          SEQUENCE {
pdcp-SN-Size    ENUMERATED {len12bits, len18bits}   OPTIONAL, -- Cond Setup2
}                                OPTIONAL,    -- Cond DRB
pdcp-Duplication   BOOLEAN                 OPTIONAL          -- Need R
//true means it support simultaneous transmission of multicast and unicast
    }
```

It should be noted that it is merely an example, and any other suitable forms of the RRC message are also feasible.

Accordingly, the terminal device 120 may receive the configuration by monitoring the multicast control channel. With the configuration, the terminal device 120 may receive 202 data packets associated with the multicast service via the multicast transmission by monitoring the multicast traffic channel.

The terminal device 120 may transmit 203 information (also referred to as second information herein) indicating a request for a unicast transmission associated with the multicast service. In this way, the unicast transmission for the multicast service can be triggered. For example, when signal quality of the multicast service received via the multicast channel becomes poor, the terminal device 120 may transmit the request. Of course, it is merely an example, and the terminal device 120 may transmit the request whenever necessary.

In some embodiments, the second information may comprise at least one of the following: the identity of the multicast service; an identity of a suggested DRB (also referred to as a further identity of a further DRB herein); and an identity of a starting data packet that the terminal device 120 expects to receive from the network device 110 via the unicast transmission. In some embodiments, the identity of the starting data packet may be a SN such as a PDCP SN. Of course, any other suitable identities are also adopted.

In some embodiments, the starting data packet may be a data packet that is currently received via the multicast transmission. Of course, the starting data packet may also be a data packet that is previously received via the multicast transmission, or a data packet that is to be received in future via the multicast transmission. In other words, the starting data packet may be any data packet associated with the multicast service.

In some embodiments, the terminal device 120 may transmit the second information via a RRC message. For example, the RRC message may be a MBMSInterestIndication message as listed below.

```
MBMSInterestIndication ::= SEQUENCE {
    drb-Identity                    DRB-Identity,
    MBMS-SessionInfo
    pdcp-sn                         PDCP-SN
}
```

It should be noted that it is merely an example, and any other suitable forms of the RRC message are also feasible.

The network device 110 may determine 204 a DRB for the unicast transmission associated with the multicast service. In some embodiments, the network device 110 may determine the DRB in response to receiving the second information from the terminal device 120. It should be noted that it is merely an example, and the determination of the DRB also can be triggered by any other suitable ways.

In some embodiments, the network device 110 may configure the further DRB suggested by the terminal device 120 as the DRB for the unicast transmission. In some alternative embodiments, the network device 110 may configure a different DRB from the further DRB as the DRB for the unicast transmission.

The network device 110 may transmit 205, to the terminal device 120, information (also referred to as first information below) comprising the identity of the multicast service and an identity of the determined DRB. In this way, an association between the DRB and the multicast service is informed to the terminal device 120.

In some embodiments, the network device 110 may configure one DRB for each multicast service. Accordingly, the network device 110 may transmit, to the terminal device 120, a list of the first information comprising identities of multiple multicast services and identities of respective DRBs.

In some embodiments, the first information may further comprise a PDCP configuration for the unicast transmission. In this way, the terminal device 120 can know the PDCP configuration of the unicast transmission. In some embodiments, the PDCP configuration may comprise at least one of the following: header compression information for a downlink transmission; a first indication about whether integrity protection is enabled; a second indication about whether a status report is required; a third indication about whether the data radio bearer is used for a duplication of a data packet associated with the multicast service or used for a retransmission of the data packet; and one or more values of a timer for reordering the data packet. For example, the PDCP configuration can be in the following form.

```
PDCP-Config ::=                    SEQUENCE {
    drb                                SEQUENCE {
headerCompression                  CHOICE {
//headerCompression only applies DL
        notUsed                        NULL,
        rohc                           SEQUENCE {
            maxCID         INTEGER (1..16383)                         DEFAULT 15,
            profiles       SEQUENCE {
                profile0x0001                  BOOLEAN,
                profile0x0002                  BOOLEAN,
                profile0x0003                  BOOLEAN,
                profile0x0004                  BOOLEAN,
                profile0x0006                  BOOLEAN,
                profile0x0101                  BOOLEAN,
                profile0x0102                  BOOLEAN,
                profile0x0103                  BOOLEAN,
                profile0x0104                  BOOLEAN
            },
            drb-ContinueROHC           ENUMERATED { true } OPTIONAL -- Need N
        },
    integrityProtection ENUMERATED{enabled} OPTIONAL, --Cond ConnectedTo5GC1
        statusReportRequired ENUMERATED { true }    OPTIONAL, -- Cond Rlc-AM
    }                              OPTIONAL,       -- Cond DRB
        },
    pdcp-Duplication      BOOLEAN                    OPTIONAL -- Need R
    //PDCP-duplication is kept, but with different definition: true means packet is
duplicated in multicast and unicast, false means unicast is used for re-transmission
    }                              OPTIONAL,       -- Cond MoreThanOneRLC
    t-Reordering           ENUMERATED {
            ms0, ms60, ms 180, ms500, ms 1000, ms2000, ms3000
    }                              OPTIONAL, -- Need S
    //only a few values can be kept
    ...,
    [[
        cipheringDisabled ENUMERATED {true}            OPTIONAL -- Cond ConnectedTo5GC
        ]]
```

It should be noted that it is merely an example, and any other suitable forms of the PDCP configuration are also feasible.

In some alternative or additional embodiments, the first information may further comprise a HARQ feedback configuration. Thereby, the HARQ feedback configuration can be semi-statically configured to the terminal device 120 via a RRC message. In some embodiments, the network device 110 may configure, to the terminal device 120, a resource set (such as a PUCCH resource) configured for HARQ feedback, for example, via a RRCSetup message as listed below.

```
dl-DataToUL-ACK SEQUENCE (SIZE (1..8)) OF
    INTEGER (0..15)
```

In some additional embodiments, the network device 110 may configure a subset of resources in the resource set to the terminal device 120 via a RRC message. Herein, PDSCH-to-HARQ feedback in the first information may correspond to the subset of resources, and may map dl-DataToUL-ACK to indicate the gap for the PUCCH resource.

In some embodiments, the network device 110 may transmit the first information or the list of the first information via a RRC message. For example, the RRC message may be a RRCReconfiguration message. Of course, any other suitable RRC messages are also feasible. In some embodiments, the first information may be shown as DRB-ToAddMod as listed below.

```
DRB-ToAddMod ::=              SEQUENCE {
cnAssociation                CHOICE {
    eps-BearerIdentity               INTEGER (0..15),
    sdap-Config                      SDAP-Config
    }                                OPTIONAL, -- Cond DRB Setup
    drb-Identity                     DRB-Identity,
```

-continued

```
MBMS-SessionInfo
PDSCH-to-HARQ_feedback
reestablishPDCP                           ENUMERATED {true}
recoverPDCP                               ENUMERATED {true}
pdcp-Config                               PDCP-Config ...,
[[
```

It should be noted that it is merely an example, the first information may also be in any other suitable forms.

Then, the terminal device 120 and the network device 110 may perform 206 communication among them based on the first information. In some embodiments, the network device 110 may transmit, to the terminal device 120 and via the determined DRB (i.e., the unicast transmission), subsequent data packets associated with the multicast service from the starting data packets. In some embodiments, the terminal device 120 may receive the subsequent data packets via the unicast transmission, and may also receive the subsequent data packets via the multicast transmission. That is, the simultaneous transmission of multicast and unicast is achieved. In some embodiments, the terminal device 120 may determine an association between SNs of these data packets via the multicast and unicast transmission based on the association between the DRB and the multicast service. In this way, these data packets can be processed.

According to embodiments of the present application, in response to receiving a data packet from the network device 110 via the multicast transmission associated with the multicast service, the terminal device 120 may transmit 207, to the network device 110 and based on the HARQ feedback configuration, a HARQ feedback for the receipt of the data packet. In some embodiments, the terminal device 120 may determine a resource from the subset (i.e., PDSCH-to- HARQ_feedback) indicated in the first information, and transmit the HARQ feedback on the determined resource. In this way, a HARQ feedback for receipt of a data packet via a multicast transmission is transmitted in a unicast form.

In some embodiments, the network device 110 may determine 208 whether the HARQ feedback indicates a failure of the receipt of the data packet. If determining that the HARQ feedback indicates the failure, the network device 110 may retransmit 209 the data packet to the terminal device 120 via the DBR indicated in the first information. Thereby, a retransmission mechanism is provided for the MBMS.

In some alternative or additional embodiments, in response to receiving a data packet from the network device 110 via a multicast transmission associated with the multicast service, the terminal device 120 may transmit 210, to the network device 110 and via the DRB indicated in the first information, an acknowledgement in a radio link control (RLC) layer for the receipt of the data packet. The network device 110 may determine 211 whether the acknowledgement is a negative acknowledgement for the receipt of the data packet. If determining that the acknowledgement is a negative acknowledgement, the network device 110 may retransmit 212 the data packet to the terminal device 120 via the DRB indicated in the first information. In this way, reliability of the multicast service can be guaranteed.

In some embodiments, PDCP entity for unicast re-transmission may be configured as below:

```
MBMS-PDCP-Config ::=          SEQUENCE {
    drb                       SEQUENCE {
       pdcp-SN-Size ENUMERATED {len12bits, len18bits}    OPTIONAL,--Cond Setup2
}                                         OPTIONAL, -- Cond DRB
pdcp-Duplication    BOOLEAN            OPTIONAL    -- Need R
       }                       OPTIONAL,    -- Cond...
```

In some embodiments, upon receiving the retransmitted data packet, the terminal device 120 may reorder the retransmitted data packet and data packets received via the multicast transmission, for example, based on their SNs. Its details are omitted here to avoid confusion with the present application.

With the process described with reference to FIG. 2, simultaneous transmission of multicast and unicast can be enabled for the MBMS and the reliability of the MBMS can be enhanced. Corresponding to the process, embodiments of the present application also provides methods of communication implemented at a terminal device and a network device respectively. It will be described in more details with reference to FIGS. 3-6.

Figure 3:
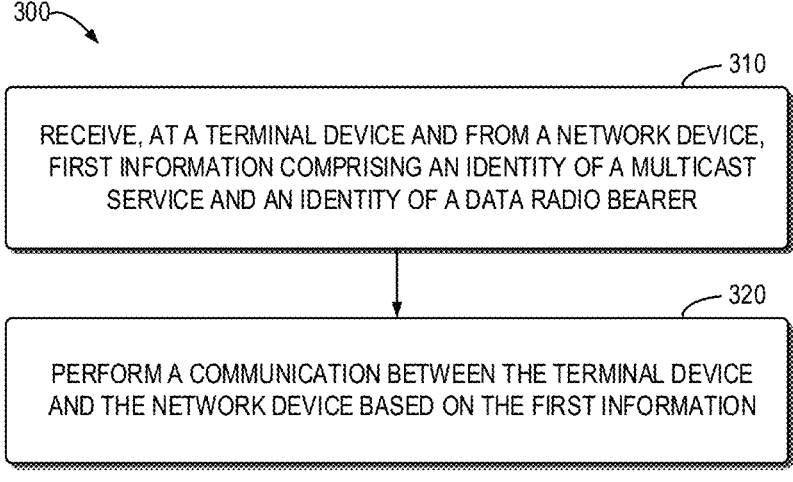
FIG. 3 illustrates an example method of communication implemented at a terminal device in accordance with some embodiments of the present disclosure.

FIG. 3 illustrates an example method 300 of communication implemented at a terminal device in accordance with some embodiments of the present disclosure. For example, the method 300 may be performed at the terminal device 120 as shown in FIG. 1. For the purpose of discussion, in the following, the method 300 will be described with reference to FIG. 1. It is to be understood that the method 300 may include additional blocks not shown and/or may omit some blocks as shown, and the scope of the present disclosure is not limited in this regard.

As shown in FIG. 3, at block 310, the terminal device 120 receive, from the network device 110, first information comprising an identity of a multicast service and an identity of a DRB. In some embodiments, the DRB is configured for a unicast transmission associated with the multicast service. In this way, the multicast service can be associated with the DRB, and simultaneous transmission of multicast and unicast for the multicast service can be facilitated.

In some embodiments, the first information may further comprise a PDCP configuration. The PDCP configuration is used for the unicast transmission. In this way, the unicast transmission for the multicast service can be achieved and the simultaneous transmission of multicast and unicast can be enabled. In some embodiments, the PDCP configuration may comprise at least one of the following: header compression information for a downlink transmission; a first indication about whether integrity protection is enabled; a second indication about whether a status report is required; a third indication about whether the DRB is used for a duplication of a data packet associated with the multicast service or used for a retransmission of the data packet; and one or more values of a timer for reordering the data packet. It should be noted that, the PDCP configuration is not limited to this, and may also include more or less information.

In some embodiments, the first information may further comprise a HARQ feedback configuration. In some embodiments, the HARQ feedback configuration may indicate a subset in a resource set configured for a HARQ feedback for receipt of a data packet via the multicast transmission associated with the multicast service. In this way, the HARQ feedback can be transmitted from the terminal device 120 to the network device 110 on a resource in the subset, and thus retransmission of a failed data packet can be facilitated.

At block 320, the terminal device 120 may perform communication with the network device based on the first information. In some embodiments, the terminal device 120 may receive data packets associated with the multicast service via both the multicast and unicast transmission. In this way, simultaneous transmission of multicast and unicast for the MBMS can be achieved. In some embodiments, the terminal device 120 may feedback, via the DRB (i.e., via the unicast transmission), a failure or success of receipt of a data packet via the multicast transmission, and receive the data packet retransmitted by the network device 110 in case of the failure of the receipt. In this way, reliability of the multicast service is enhanced. More details will be described with reference to FIGS. 4-6.

FIG. 4 illustrates another example method 400 of communication implemented at a terminal device in accordance with some embodiments of the present disclosure. For example, the method 400 may be performed at the terminal device 120 as shown in FIG. 1. For the purpose of discussion, in the following, the method 400 will be described with reference to FIG. 1. It is to be understood that the method 400 may include additional blocks not shown and/or may omit some blocks as shown, and the scope of the present disclosure is not limited in this regard.

As shown in FIG. 4, at block 410, the terminal device 120 may receive, from the network device 110 and via a multicast control channel (for example, MCCH), a configuration for multicast transmission associated with a multicast service. In some embodiments, the configuration may comprise at least one of the following: an identity of the multicast service; a length of an identity of a data packet associated with the multicast service; and a fourth indication about whether the multicast service supports both the multicast transmission and a unicast transmission associated with the multicast service.

At block 420, based on the configuration received at block 410, the terminal device 120 may receive a data packet from the network device 110 via the multicast transmission. For example, when a multicast signal received by the terminal device 120 becomes poor, the terminal device 120 may request a unicast transmission for the multicast service. Accordingly, at block 430, the terminal device 120 may transmit, to the network device 110, second information indicating a request for a unicast transmission associated with the multicast service. In some embodiments, the second information comprises at least one of the following: the identity of the multicast service; a further identity of a further DRB; and an identity of a starting data packet that the terminal device expects to receive from the network device via the unicast transmission.

At block 440, the terminal device 120 may receive, from the network device 110, first information comprising an identity of the multicast service and an identity of a DRB. In some embodiments, the first information may further comprise at least one of a PDCP configuration and a HARQ feedback configuration. In some embodiments, the PDCP configuration may comprise at least one of the following: header compression information for a downlink transmission; a first indication about whether integrity protection is enabled; a second indication about whether a status report is required; a third indication about whether the data radio bearer is used for a duplication of a data packet associated with the multicast service or used for a retransmission of the data packet; and one or more values of a timer for reordering the data packet.

At block 450, the terminal device 120 may receive, from the network device 110 and via the DRB, subsequent data packets associated with the multicast service from the starting data packet. In some embodiments, the terminal device 120 may also receive the subsequent data packets via the multicast transmission. In this way, simultaneous transmission of multicast and unicast can be achieved.

In some embodiments, in response to receipt of a data packet from the network device 110 via the multicast transmission, the terminal device 120 may transmit, to the network device 110 and based on a HARQ feedback configuration, a HARQ feedback for the receipt of the data packet; and receive, via the DRB, the data packet retransmitted by the network device in response to the HARQ feedback indicating a failure of the receipt of the data packet. In some alternative or additional embodiments, in response to receipt of a data packet from the network device 110 via a multicast transmission associated with the multicast service, the terminal device 120 may transmit, to the network device 110 and via the DRB, an acknowledgement in a RLC layer for the receipt of the data packet; and receive, via the DRB, the data packet retransmitted by the network device 110 in response to the acknowledgement being a negative acknowledgement for the receipt of the data packet. More details will be described below with reference to FIGS. 5 and 6.

Figure 5:
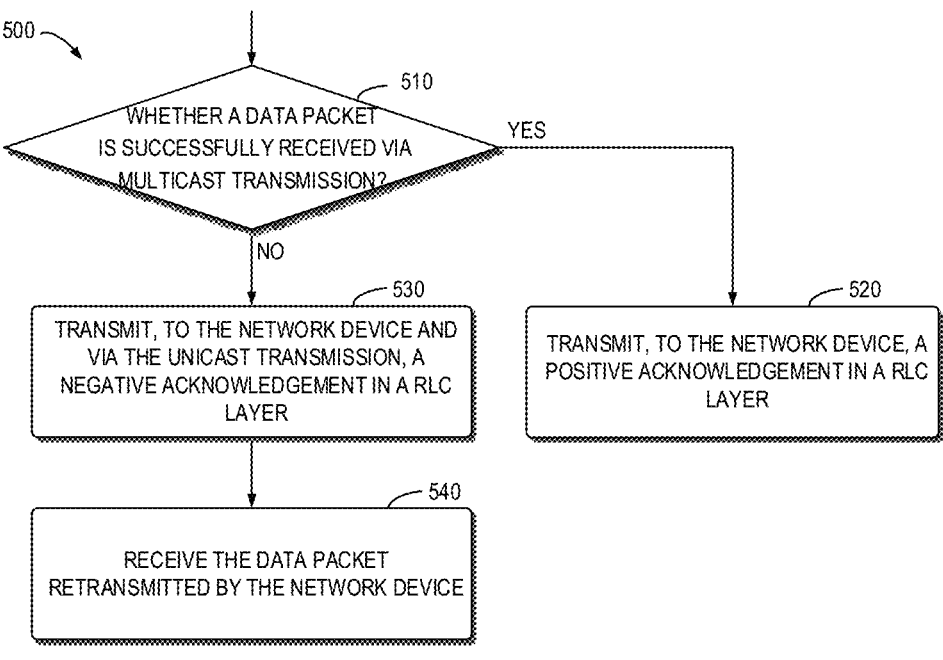
FIG. 5 illustrates another example method of communication implemented at a terminal device in accordance with some embodiments of the present disclosure.

FIG. 5 illustrates another example method 500 of communication implemented at a terminal device in accordance with some embodiments of the present disclosure. For example, the method 500 may be performed at the terminal device 120 as shown in FIG. 1. For the purpose of discussion, in the following, the method 500 will be described with reference to FIG. 1. It is to be understood that the method 500 may include additional blocks not shown and/or may omit some blocks as shown, and the scope of the present disclosure is not limited in this regard.

As shown in FIG. 5, at block 510, the terminal device 120 determine whether a data packet is successfully received via a multicast transmission. If determining that the data packet is successfully received, at block 520, the terminal device 120 may transmit, to the network device 110 and via a DRB associated with the multicast service, a positive acknowledgement in a RLC layer. If determining that the data packet is not successfully received, at block 530, the terminal device 120 may transmit, to the network device 110, a negative acknowledgement in a RLC layer. At block 540, the terminal device 120 may receive the data packet retransmitted by the network device 110. In this way, a retransmission mechanism for the MBMS can be provided based on a feedback in a RLC layer.

Figure 6:
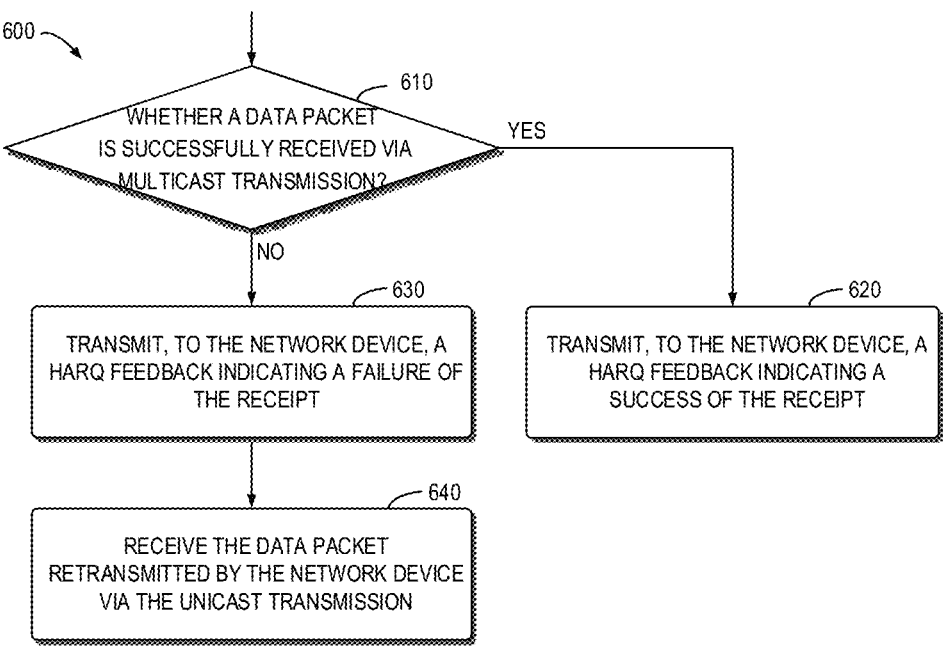
FIG. 6 illustrates another example method of communication implemented at a terminal device in accordance with some embodiments of the present disclosure.

FIG. 6 illustrates another example method 600 of communication implemented at a terminal device in accordance with some embodiments of the present disclosure. For example, the method 600 may be performed at the terminal device 120 as shown in FIG. 1. For the purpose of discussion, in the following, the method 600 will be described with reference to FIG. 1. It is to be understood that the method 500 may include additional blocks not shown and/or may omit some blocks as shown, and the scope of the present disclosure is not limited in this regard.

As shown in FIG. 6, at block 610, the terminal device 120 determine whether a data packet is successfully received via a multicast transmission. If determining that the data packet is successfully received, at block 620, the terminal device 120 may transmit, to the network device 110 and based on a HARQ feedback configuration for the multicast service, a HARQ feedback indicating a success of the receipt of the data packet. If determining that the data packet is not successfully received, at block 630, the terminal device 120 may transmit, to the network device 110 and based on the HARQ feedback configuration, a HARQ feedback indicating a failure of the receipt of the data packet. At block 640, the terminal device 120 may receive the data packet retransmitted by the network device 110. In this way, a retransmission mechanism for the MBMS can be provided based on a feedback in a MAC layer.

Figure 7:
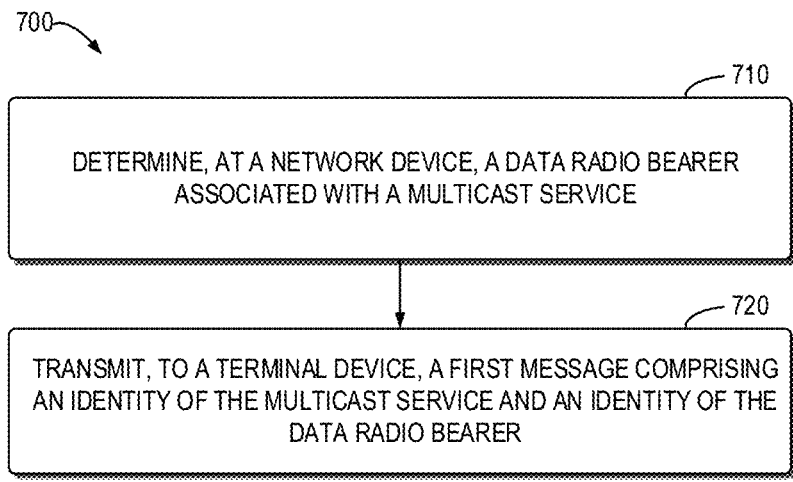
FIG. 7 illustrates an example method of communication implemented at a network device in accordance with some embodiments of the present disclosure.

So far, the method implemented at a terminal device is described. Correspondingly, embodiments of the present disclosure also provide a method implemented at a network device. FIG. 7 illustrates an example method 700 of communication implemented at a network device in accordance with some embodiments of the present disclosure. For example, the method 700 may be performed at the network device 110 as shown in FIG. 1. For the purpose of discussion, in the following, the method 700 will be described with reference to FIG. 1. It is to be understood that the method 700 may include additional blocks not shown and/or may omit some blocks as shown, and the scope of the present disclosure is not limited in this regard.

As shown in FIG. 7, at block 710, the network device 110 determines a DRB associated with a multicast service. In some embodiments, the DRB is configured for a unicast transmission associated with the multicast service. In some embodiments, the network device 110 may receive second information indicating a request for the unicast transmission, and determine the DRB based on the second information. In some embodiments, the second information may comprise at least one of the following: an identity of the multicast service; a further identity of a further DRB; and an identity of a starting data packet that the terminal device expects to receive from the network device via the DRB.

In some embodiments, the network device 110 may further transmit, via a multicast control channel, a configuration for a multicast transmission associated with the multicast service. In some embodiments, the configuration may comprise at least one of the following: the identity of the multicast service; a length of an identity of a data packet associated with the multicast service; and a fourth indication about whether the multicast service supports both the multicast transmission and a unicast transmission associated with the multicast service. In this way, simultaneous transmission of multicast and unicast can be facilitated.

At block 720, the network device 110 transmit, to the terminal device 120, first information comprising an identity of the multicast service and an identity of the DRB. In this way, the DRB can be associated with the multicast service, and simultaneous transmission of multicast and unicast for the MBMS can be achieved.

In some embodiments, the first information may further comprise a PDCP configuration. The PDCP configuration is used for the unicast transmission. In this way, the unicast transmission for the multicast service can be achieved and the simultaneous transmission of multicast and unicast can be enabled. In some embodiments, the PDCP configuration may comprise at least one of the following: header compression information for a downlink transmission; a first indication about whether integrity protection is enabled;

a second indication about whether a status report is required; a third indication about whether the DRB is used for a duplication of a data packet associated with the multicast service or used for a retransmission of the data packet; and one or more values of a timer for reordering the data packet. It should be noted that, the PDCP configuration is not limited to this, and may also include more or less information.

In some embodiments, the first information may further comprise a HARQ feedback configuration. In some embodiments, the HARQ feedback configuration may indicate a subset in a resource set configured for a HARQ feedback for receipt of a data packet via the multicast transmission associated with the multicast service. In this way, the HARQ feedback resource can be configured to the terminal device 120.

In some embodiments, the network device 110 may receive, from the terminal device 120, a HARQ feedback for receipt of a data packet via a multicast transmission associated with the multicast service. In some embodiments, if the HARQ feedback indicates a failure of the receipt of the data packet, the network device 110 may retransmit, to the terminal device 120, the data packet via the DRB. In this way, reliability of the multicast service can be guaranteed.

In some alternative or additional embodiments, the network device 110 may receive, from the terminal device 120 and via the DRB, an acknowledgement in a RLC layer for receipt of a data packet via a multicast transmission associated with the multicast service. In some embodiments, if the acknowledgement is a negative acknowledgement for the receipt of the data packet, the network device 110 may retransmit, to the terminal device 120, the data packet via the DRB. In this way, reliability of the multicast service can be further guaranteed.

The implementations of the methods described in FIGS. 3-7 substantially correspond to the process described in connection with FIG. 2, and thus other details are not repeated here. With the methods 300-700 according to embodiments of the present disclosure, simultaneous transmission of multicast and unicast for a multicast service can be achieved, and reliability of the multicast service can be enhanced.

Figure 8:
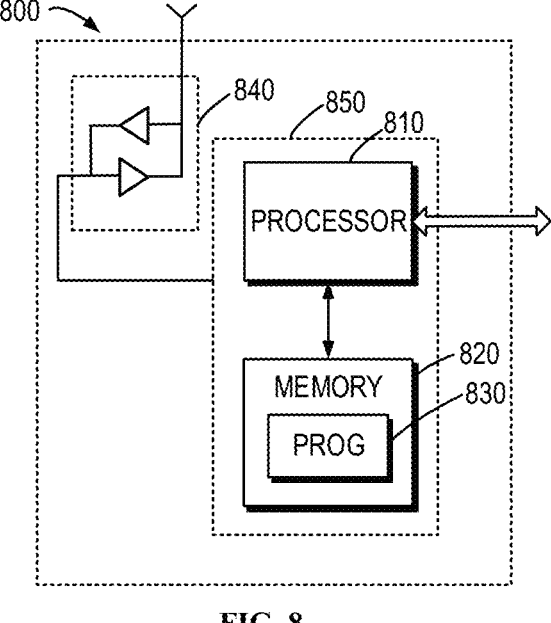
FIG. 8 is a simplified block diagram of a device that is suitable for implementing embodiments of the present disclosure.

FIG. 8 is a simplified block diagram of a device 800 that is suitable for implementing embodiments of the present disclosure. The device 800 can be considered as a further example implementation of the network device 110 or the terminal device 120 as shown in FIG. 1. Accordingly, the device 800 can be implemented at or as at least a part of the network device 110 or the terminal device 120.

As shown, the device 800 includes a processor 810, a memory 820 coupled to the processor 810, a suitable transmitter (TX) and receiver (RX) 840 coupled to the processor 810, and a communication interface coupled to the TX/RX 840. The memory 810 stores at least a part of a program 830. The TX/RX 840 is for bidirectional communications. The TX/RX 840 has at least one antenna to facilitate communication, though in practice an Access Node mentioned in this application may have several ones. The communication interface may represent any interface that is necessary for communication with other network elements, such as X2/Xn interface for bidirectional communications between eNBs/gNBs, S1/NG interface for communication between a Mobility Management Entity (MME)/Access and Mobility Management Function (AMF)/SGW/UPF and the eNB/gNB, Un interface for communication between the eNB/gNB and a relay node (RN), or Uu interface for communication between the eNB/gNB and a terminal device.

The program 830 is assumed to include program instructions that, when executed by the associated processor 810, enable the device 800 to operate in accordance with the embodiments of the present disclosure, as discussed herein with reference to FIGS. 1 to 7. The embodiments herein may be implemented by computer software executable by the processor 810 of the device 800, or by hardware, or by a combination of software and hardware. The processor 810 may be configured to implement various embodiments of the present disclosure. Furthermore, a combination of the processor 810 and memory 820 may form processing means 850 adapted to implement various embodiments of the present disclosure.

The memory 820 may be of any type suitable to the local technical network and may be implemented using any suitable data storage technology, such as a non-transitory computer readable storage medium, semiconductor based memory devices, magnetic memory devices and systems, optical memory devices and systems, fixed memory and removable memory, as non-limiting examples. While only one memory 820 is shown in the device 800, there may be several physically distinct memory modules in the device 800. The processor 810 may be of any type suitable to the local technical network, and may include one or more of general purpose computers, special purpose computers, microprocessors, digital signal processors (DSPs) and processors based on multicore processor architecture, as non-limiting examples. The device 800 may have multiple processors, such as an application specific integrated circuit chip that is slaved in time to a clock which synchronizes the main processor.

Generally, various embodiments of the present disclosure may be implemented in hardware or special purpose circuits, software, logic or any combination thereof. Some aspects may be implemented in hardware, while other aspects may be implemented in firmware or software which may be executed by a controller, microprocessor or other computing device. While various aspects of embodiments of the present disclosure are illustrated and described as block diagrams, flowcharts, or using some other pictorial representation, it will be appreciated that the blocks, apparatus, systems, techniques or methods described herein may be implemented in, as non-limiting examples, hardware, software, firmware, special purpose circuits or logic, general purpose hardware or controller or other computing devices, or some combination thereof.

The present disclosure also provides at least one computer program product tangibly stored on a non-transitory computer readable storage medium. The computer program product includes computer-executable instructions, such as those included in program modules, being executed in a device on a target real or virtual processor, to carry out the process or method as described above with reference to FIGS. 2 to 7. Generally, program modules include routines, programs, libraries, objects, classes, components, data structures, or the like that perform particular tasks or implement particular abstract data types. The functionality of the program modules may be combined or split between program modules as desired in various embodiments. Machine-executable instructions for program modules may be executed within a local or distributed device. In a distributed device, program modules may be located in both local and remote storage media.

Program code for carrying out methods of the present disclosure may be written in any combination of one or more programming languages. These program codes may be provided to a processor or controller of a general purpose computer, special purpose computer, or other programmable data processing apparatus, such that the program codes, when executed by the processor or controller, cause the functions/operations specified in the flowcharts and/or block diagrams to be implemented. The program code may execute entirely on a machine, partly on the machine, as a stand-alone software package, partly on the machine and partly on a remote machine or entirely on the remote machine or server.

The above program code may be embodied on a machine readable medium, which may be any tangible medium that may contain, or store a program for use by or in connection with an instruction execution system, apparatus, or device. The machine readable medium may be a machine readable signal medium or a machine readable storage medium. A machine readable medium may include but not limited to an electronic, magnetic, optical, electromagnetic, infrared, or semiconductor system, apparatus, or device, or any suitable combination of the foregoing. More specific examples of the machine readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the present disclosure, but rather as descriptions of features that may be specific to particular embodiments. Certain features that are described in the context of separate embodiments may also be implemented in combination in a single embodiment. Conversely, various features that are described in the context of a single embodiment may also be implemented in multiple embodiments separately or in any suitable sub-combination.

Although the present disclosure has been described in language specific to structural features and/or methodological acts, it is to be understood that the present disclosure defined in the appended claims is not necessarily limited to the specific features or acts described above. Rather, the specific features and acts described above are disclosed as example forms of implementing the claims.

What is claimed is:

1. A method of communication, comprising:

receiving, at a terminal device and from a network device, first information comprising an identity of a multicast service and an identity of a radio bearer of the multicast service; and performing a communication between the terminal device and the network device based on the first information; and receiving, at the terminal device, and from the network device, a retransmitted data packet of the multicast service using unicast transmission.

2. The method of claim 1, wherein the first information further comprises at least one of the following:

a packet data convergence protocol (PDCP) configuration; and a hybrid automatic repeat request (HARQ) feedback configuration, and wherein the method further comprises:

receiving, at the terminal device, and from the network device, a data packet of the multicast service; and transmitting, at the terminal device, and to the network device, a HARQ feedback in response to receipt of the data packet of the multicast service, and wherein the retransmitted data packet of the multicast service is received using unicast transmission in response to the HARQ feedback indicating a failure of the receipt of the data packet of the multicast service.

3. The method of claim 2, wherein the PDCP configuration comprises at least one of the following:

header compression information for a downlink transmission;

a first indication about whether integrity protection is enabled;

a second indication about whether a status report is required;

a third indication about whether the radio bearer is used for a duplication of a data packet associated with the multicast service or used for a retransmission of the data packet; and one or more values of a timer for reordering the data packet.

4. The method of claim 1, further comprising:

transmitting, to the network device, second information indicating a request for a unicast transmission associated with the multicast service.

5. The method of claim 4, wherein the second information comprises at least one of the following:

the identity of the multicast service;

a further identity of a further radio bearer; and an identity of a starting data packet that the terminal device expects to receive from the network device via the unicast transmission.

6. The method of claim 1, further comprising:

receiving, from the network device and via a multicast control channel, a configuration for a multicast transmission associated with the multicast service.

7. The method of claim 6, wherein the configuration comprises at least one of the following:

the identity of the multicast service;

a length of an identity of a data packet associated with the multicast service; and a fourth indication about whether the multicast service supports both the multicast transmission and a unicast transmission associated with the multicast service.

8. The method of claim 1, further comprising:

in response to receipt of a data packet from the network device via a multicast transmission associated with the multicast service, transmitting, to the network device and via the radio bearer, an acknowledgement in a radio link control (RLC) layer for the receipt of the data packet; and receiving, via the radio bearer, the data packet retransmitted by the network device in response to the acknowledgement being a negative acknowledgement for the receipt of the data packet.

9. A method of communication, comprising:

determining, at a network device, a radio bearer associated with a multicast service; and transmitting, to a terminal device, first information comprising an identity of the multicast service and an identity of the radio bearer; and transmitting, to the terminal device and from the network device, a retransmitted data packet of the multicast service using unicast transmission.

10. The method of claim 9, wherein the first information further comprises at least one of the following:

a packet data convergence protocol (PDCP) configuration; and a hybrid automatic repeat request (HARQ) feedback configuration, and wherein the method further comprises:

transmitting, to the terminal device and from the network device, a data packet of the multicast service; and receiving, from the terminal device, and to a network device, a HARQ feedback in response to receipt of the data packet of the multicast service, and wherein the retransmitted data packet of the multicast service is received using unicast transmission in response to the HARQ feedback indicating a failure of the receipt of the data packet of the multicast service.

11. The method of claim 10, wherein the PDCP configuration comprises at least one of the following:

header compression information for a downlink transmission;

a first indication about whether integrity protection is enabled;

a second indication about whether a status report is required;

a third indication about whether the radio bearer is used for a duplication of a data packet associated with the multicast service or used for a retransmission of the data packet; and one or more values of a timer for reordering the data packet.

12. The method of claim 9, further comprising:

receiving, from the terminal device, second information indicating a request for a unicast transmission associated with the multicast service.

13. The method of claim 12, the second information comprises at least one of the following:

the identity of the multicast service;

a further identity of a further radio bearer; and an identity of a starting data packet that the terminal device expects to receive from the network device via the radio bearer.

14. The method of claim 9, further comprising:

transmitting, via a multicast control channel, a configuration for a multicast transmission associated with the multicast service.

15. The method of claim 14, wherein the configuration comprises at least one of the following:

the identity of the multicast service;

a length of an identity of a data packet associated with the multicast service; and a fourth indication about whether the multicast service supports both the multicast transmission and a unicast transmission associated with the multicast service.

16. The method of claim 9, further comprising:

receiving, from the terminal device and via the radio bearer, an acknowledgement in a radio link control (RLC) layer for receipt of a data packet via a multicast transmission associated with the multicast service; and in response to the acknowledgement is a negative acknowledgement for the receipt of the data packet, retransmitting, to the terminal device, the data packet via the radio bearer.

* * * * *